United States Patent [19]
Fehlberg

[11] 3,731,896
[45] May 8, 1973

[54] ENGINE MOUNT ASSEMBLY
[75] Inventor: Chester J. Fehlberg, Rochester, Mich.
[73] Assignee: General Motors Corporation, Detroit, Mich.
[22] Filed: Jan. 7, 1972
[21] Appl. No.: 216,203

[52] U.S. Cl. .................................248/9, 180/64 R
[51] Int. Cl. ..............................................F16f 15/00
[58] Field of Search.........................248/3, 6, 7, 8, 9, 248/10, 15, 5, 26; 267/153; 180/64 R

[56]  References Cited
UNITED STATES PATENTS

| 3,565,373 | 2/1971 | Frye | 248/9 |
|---|---|---|---|
| 3,544,048 | 12/1970 | Oshima | 248/18 |
| 2,490,492 | 12/1949 | Tyler et al. | 248/5 |
| 2,690,891 | 10/1954 | Henshaw | 248/5 |
| 3,548,964 | 12/1970 | Krauss | 180/64 R |
| 2,781,990 | 2/1957 | Via | 248/9 |
| 1,940,686 | 12/1933 | Lord | 180/64 R |

FOREIGN PATENTS OR APPLICATIONS 282,188  12/1927  Great Britain............................248/9

Primary Examiner—J. Franklin Foss
Attorney—J. L. Carpenter et al.

[57] ABSTRACT

An engine mount assembly for resiliently supporting an engine on a frame of a motor vehicle includes a frame attaching bracket in which is mounted an engine attaching bushing. The bushing and bracket have a plurality of cooperating opposed walls providing separate spaces in which rubber is molded and assembled in compression to provide resilient engine mounting for jounce, for and aft, and roll movement with respect to the frame. The separate spaces provide for the use of different rubbers and different preloads for particular engine-vehicle combinations. In addition, the bushing and bracket cooperate to limit relative movement of the engine with respect to the frame in all directions.

3 Claims, 8 Drawing Figures

PATENTED MAY 8 1973  3,731,896

ENGINE MOUNT ASSEMBLY

This invention relates to an engine mount assembly and more particularly to an engine mount assembly for resiliently supporting an engine on a frame of a motor vehicle to provide for jounce, fore and aft, and roll control of the engine relative to the frame.

In a motor vehicle powered by an internal combustion engine there are numerous vibrations set up such as jounce vibrations, fore and aft vibrations, and torque and torque reaction vibrations. To isolate these engine vibrations from the passenger compartment, it is customary practice to use resilient motor mounts to support the engine on the frame of the motor vehicle and to a large extent the results have been very satisfactory. However, these vibrations will vary in both frequency and amplitude in different engine-vehicle combinations with the result that rather than a universal type engine mount that can be tuned for a particular application, it is common practice to employ different type mounts for the different applications to provide the desired vibration isolation characteristics. This is due in part to the common practice of using a single rubber compound which is dictated by the more conventional engine mount structure. It is desirable that a single type engine mount assembly be capable of tuning for different jounce, fore and aft, and roll characteristics for the different engine-frame combinations yet remain simple in structure and inexpensive to manufacture.

The engine mount assembly according to the present invention includes a frame attaching bracket in which an engine attaching bushing is mounted. Opposite sides of the bushing cooperate with opposite walls of the bracket to provide separate spaces on the opposite sides of the bushing. Rubber is bonded and assembled in compression in the separate spaces and operates to resiliently support the bushing relative to the bracket for jounce of the engine and also engine roll. The bracket and the bushing also have cooperating opposed walls which load the rubber on one side of the bushing in compression to control fore and aft engine movement. The bushing is secured by a bolt to a bracket on the engine.

An object of the present invention is to provide a new and improved engine mount assembly for resiliently supporting an engine on a frame of a motor vehicle.

Another object is to provide an engine mount assembly for resiliently supporting an engine on a frame of a motor vehicle to provide resilient engine mounting for jounce, fore and aft, and roll control and also to maintain connection between the engine and the frame when the limit of the mount's resilient material is exceeded with such operation being effected by an engine attaching bushing mounted in a frame attaching bracket with the resilient material molded and assembled in compression in separate spaces between these members.

Another object is to provide an engine mount assembly for resiliently supporting an engine on a frame of a motor vehicle wherein an engine attaching bushing is located in a frame attaching bracket and cooperating opposed walls of these members provides separate spaces in which rubber is molded and assembled in compression to provide resilient mounting for jounce, fore and aft, and roll control.

These and other objects of the present invention will be more apparent from the following description and drawing in which.

Figure 1:
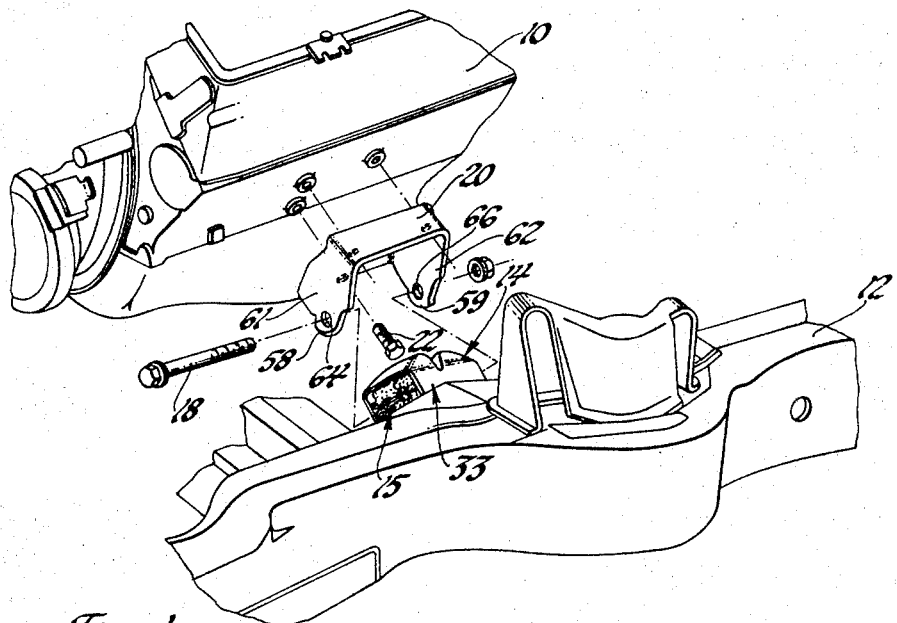
FIG. 1 is a partially exploded, perspective view of an internal combustion engine resiliently supported on a frame of a motor vehicle by an engine mount assembly constructed according to the present invention.
Figure 2:
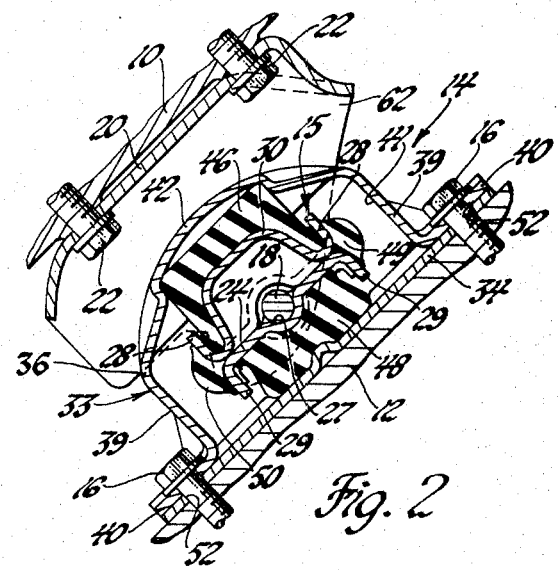
FIG. 2 is an enlarged transverse sectional view of the engine mount assembly of FIG. 1.
Figure 3:
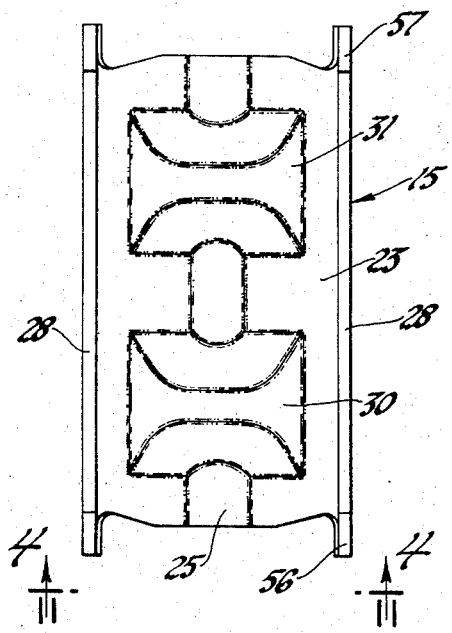
FIG. 3 is an enlarged plan view of the bushing of the engine mount assembly of FIG. 2.
Figure 4:
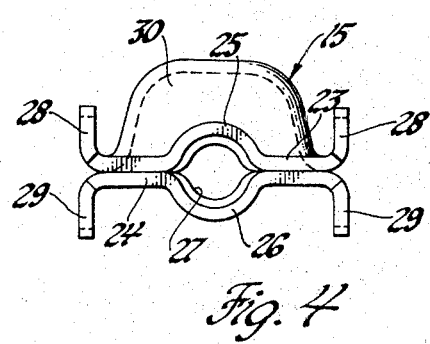
FIG. 4 is an end view of the bushing taken along the line 4—4 of FIG. 3.

Referring now to the drawing and particularly to FIG. 1, there is shown an internal combustion engine 10 which is supported at its opposite sides on a frame 12 of a motor vehicle by a pair of engine mount assemblies 14 constructed according to the present invention, there being only one engine mount assembly shown. The engine mount assembly 14 is generally of the bushing type and is secured to the frame 12 by bolts 16 as shown in FIG. 2. The engine mount assembly 14 supports the engine 10 on the frame by its bushing 15 receiving a bolt 18 whose axis extends longitudinally of the engine and vehicle frame. The bolt 18 is supported near its opposite ends by an engine bracket 20 that is secured by bolts 22 to one side of the engine 10, the engine bracket 20 having a generally U-shaped configuration that saddles the fore and aft ends of the engine mount assembly 14. Referring to FIGS. 2, 3, and 4, the bushing 15 is an assembly comprising an upper half member 23 and a lower half member 24 which are formed with central semicircular portions 25 and 26 extending the length of these bushing members. The semicircular portions 25 and 26 are opposed to each other to cooperatively provide a central circular opening 27 which receives the mounting bolt 18. The bushing members 23 and 24 are also formed near their longitudinally extending edges to provide longitudinally extending rails or sides 28 and 29 that turn away from but are aligned with each other to provide roll stops as described in more detail later. The two bushing members 23 and 24 are rigidly secured together by spot welds at points on the abutting flat portions of these members intermediate the central opening 27 and the sides 28 and 29. In addition, the upper bushing member 23 is formed to have a pair of domes or humps 30 and 31 that are spaced along the length of this member and extend transverse to the axial direction of the bushing opening 27.

Figure 5:
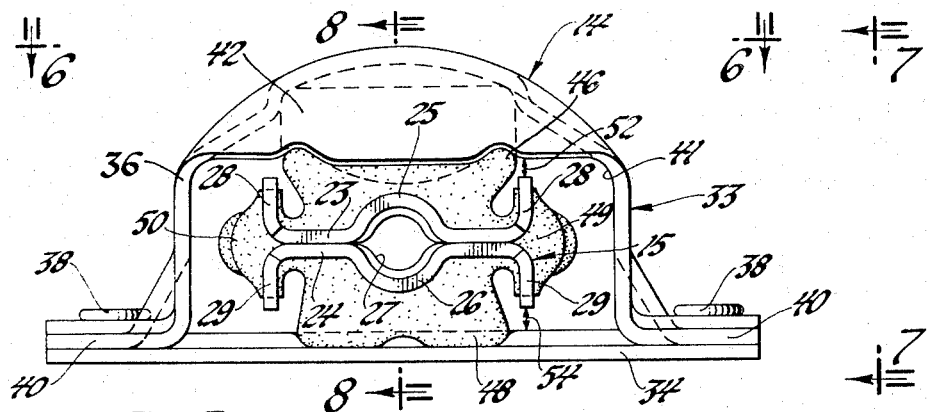
FIG. 5 is an enlarged end view of the engine mount assembly per se of FIG. 1.
Figure 6:
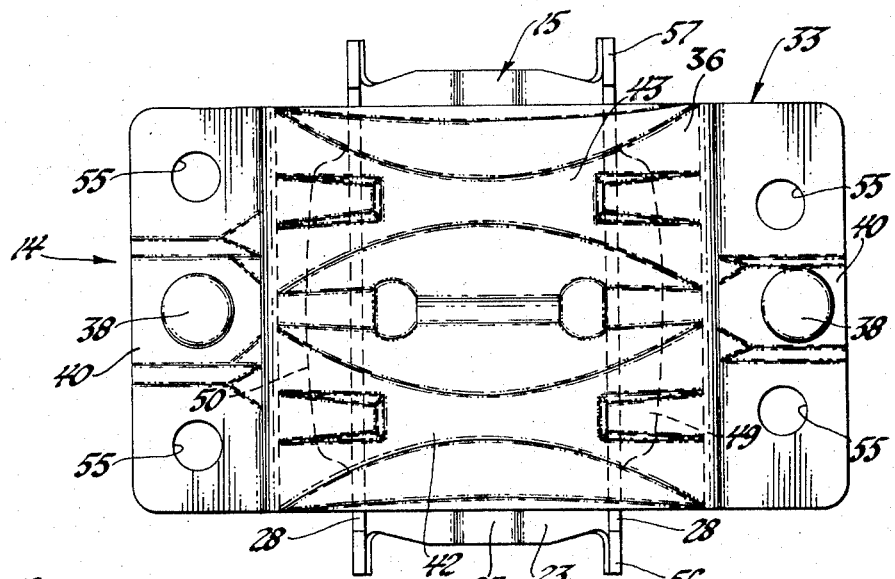
FIG. 6 is a plan view of the engine mount assembly taken along the line 6—6 of FIG. 5.
Figure 7:
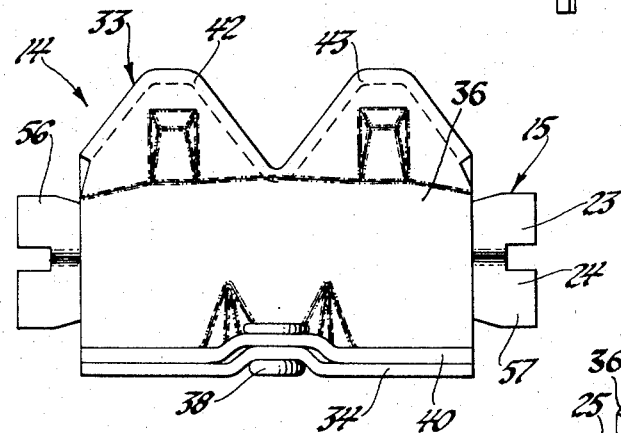
FIG. 7 is a side view of the engine mount assembly taken along the line 7—7 of FIG. 5.

The bushing assembly 15 is located in a frame attaching bracket assembly 33 comprising a lower plate 34 which is flat shaped and an upper plate 36 which has a U-shape as viewed in FIGS. 2 and 5. The frame attaching bracket members 34 and 36 are secured together by two rivets 38 which are located outboard of the opposite sides 39 of the upper plate member 36 at points midway along the length of this member with these rivets extending through the flat flanges 40 which abut with the flat lower bracket plate 34. The frame attaching bracket members 34 and 36 cooperatively define an opening 41 which is rectangular in cross-section as viewed in FIGS. 2 and 5 and extends longitudinally of the engine mount assembly for receiving the bushing assembly 15. The upper frame bracket member 36 has, in addition, a pair of domes or humps 42 and 43 which are spaced along the length of this member and extend transverse to the opening 41. These humps 42 and 43 are for cooperating with the humps 30 and 31 of the bushing assembly as described in more detail later.

Figure 8:
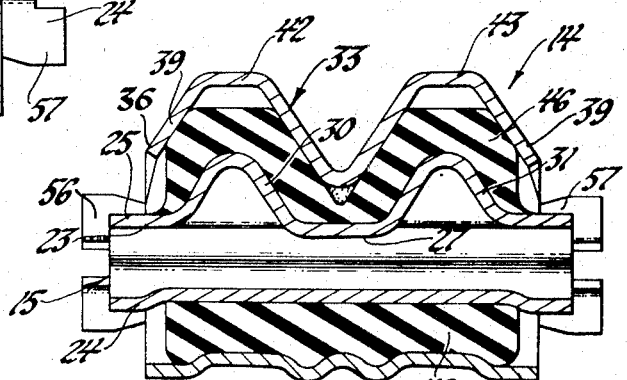
FIG. 8 is a longitudinal sectional view of the engine mount assembly taken along the line 8—8 of FIG. 5.

The welded bushing assembly 15 is located in the opening 41 of the frame attaching bracket assembly 33 with the humped bushing member 23 opposite the humped roof of the upper frame attaching member 36 and the other bushing member 24 opposite the lower frame attaching bracket member 34. Thus, there are provided separate spaces on opposite sides of the bushing assembly 15 between the opposed walls or sides of the bushing and the frame attaching bracket. In addition, the bushing assembly's humps 30 and 31 are located opposite the frame attaching bracket assembly humps 42 and 43 with the size and shape of these humps being such that there is space therebetween for resilient material as shown in FIG. 8. Furthermore, the bushing humps 30 and 31 extend into the adjacent spaces provided by the bracket humps 42 and 43 to provide interference between the valley of the bracket humps and the peaks of the bushing humps on fore or aft movement of a certain amount between the bracket and bushing. Between the bracket assembly 33 and the bushing assembly 15, separate bodies 46 and 48 of resilient material such as rubber are molded and assembled in compression. In addition, bodies 49 and 50 of resilient material are molded to the outer surfaces of sides 28 and 29 of the bushing assembly opposite the sides 39 of the bracket assembly. As shown in FIG. 5, the clearances 52 and 54 between the edges of the bushing rails 28 and 29 and the upper and lower bracket members 36 and 34, respectively, are determined to limit the amount of bushing movement in this direction to assure that both of the resilient bodies 46 and 48 remain in compression during all normal movement.

With the engine mount 14 completely assembled with the bodies of resilient material molded and assembled in compression, the engine mount 14 is attached to the frame of the vehicle by the bolts 16 which pass through holes 55 through the bracket members 34 and 36. This mounting is arranged relative to the roll axis of the engine so that the resilient bodies 46 and 48 are in position to resist engine roll in shear and engine jounce in compression. The opposite ends of the bushing 15 are provided with extensions 56 and 57 which extend sufficiently to engage lower edges 58 and 59 of the fore and aft legs 61 and 62 of the engine bracket 20 to aid in installing the bracket 20 with the engine over the frame attached engine mount 14. That is, their engagement prevents the engine from proceeding downward past the engine mount prior to insertion of the mounting bolt 18 through the aligned holes 64 and 66 in the bracket legs 61 and 62 and the opening 27 of the intermediately arranged engine mount bushing 15. It will be understood that there is another engine mount assembly like assembly 14 on the opposite side of the engine so that the engine is supported on the frame 12 at two points by mounting assemblies according to the present invention. These mounts act as the forward supports of a mounting system which may be of the three point type wherein an additional centrally located rearward mount, not shown, is provided with its point of attachment being between a transmission secured to the engine and a cross member of the frame.

Engine movement in the fore and aft direction, the vertical direction, and the roll direction is resisted by the resilient bodies 46 and 48 of the mount assembly which by the arrangement of the rigid parts are normally maintained in compression. For example, both of the resilient bodies 46 and 48 are always in compression between the bushing assembly 15 and the engine attaching bracket assembly to control vertical engine movement during jounce and also to control rolling engine movement with the other resilient bodies 49 and 50 acting as resilient stops or bumpers with mechanical backup to limit rolling engine movement about its axis by these stops engaging the sides 39 of the bracket 33. Fore and aft movement of the engine 10 is resisted by the lower resilient body 48 taking such movement in shear and the upper resilient body 46 in two of the four regions between the bushing humps 30 and 31 and the bracket humps 42 and 43 taking such movement in compression. Furthermore, the interference fit of these humps is available to mechanically limit fore and aft engine movement.

With this structural arrangement, it will also be appreciated that the resilient bodies may be of different compositions so as to obtain the desired characteristics for controlling engine movement in the various directions of motion and to dampen out various forms of vibration. Furthermore, with the resilient bodies 46 and 48 being preloaded and remaining in compression during all normal relative engine-frame movement, the fatigue life of these materials is substantially increased. Thus, the engine mount assembly according to the present invention has a long life in addition to being of very simple construction well suited for mass production and at a relatively low cost.

The above described embodiment is illustrative of the invention which may be modified within the scope of the appended claims.

What is claimed is:

1. In an engine mount assembly for resiliently supporting an engine on a frame, bracket means having two pairs of opposed walls transverse to each other, bushing means located in said bracket means comprising a pair of members secured together and having intermediate inner side portions formed to cooperatively provide a fastener opening extending therebetween and with one pair of outer sides of said plates disposed opposite one pair of said walls of said bracket means and another pair of outer sides of said bushing members disposed opposite the other pair of said walls of said bracket means, one of said one pair of said outer sides of said bushing members and one of said one pair of said walls of said bracket means also arranged opposite each other in the axial direction of said bushing means, resilient means secured in compression between said one pair of said outer sides of said bushing members and said one pair of said walls of said bracket means whereby relative movement between said bushing means and said bracket means is resisted by said resilient means while loaded in compression in both the axial direction of said bushing means and also in directions transverse thereto and whereby maximum relative movement between said bushing means and said bracket means in both the axial direction of said bushing means and directions transverse thereto is limited by said walls of said bracket means and said sides of said bushing means, and resilient means secured to said other pair of said outer sides of said bushing members for engaging said other pair of said walls of said bracket means.

2. The engine mount assembly set forth in claim 1 and only said one of said outer sides of said bushing members and only said one of said walls of said bracket means having humps arranged opposite each other to provide interference with each other in said axial direction of said bushing means.

3. The engine mount assembly set forth in claim 2 and said bracket means comprising a U-shaped bracket member and a flat-shaped bracket member providing a rectangular-shaped opening receiving said bushing means and said resilient means and with said bracket means hump formed on only said U-shaped bracket member.

* * * * *